(12) United States Patent
Barnett et al.

(10) Patent No.: US 10,283,817 B2
(45) Date of Patent: May 7, 2019

(54) BATTERY CHARGER AND METHOD OF CHARGING A BATTERY

(71) Applicant: Black & Decker Inc., New Britain, CT (US)

(72) Inventors: Corey Barnett, Bowie, MD (US); David A. Miller, Baltimore, MD (US); Kelly E. Dyer, Silver Spring, MD (US); Oleksiy Sergyeyenko, Baldwin, MD (US); Kevin Wenger, Baltimore, MD (US); Nathan Cruise, Phoenix, MD (US)

(73) Assignee: Black & Decker, Inc., New Britain, CT (US)

( * ) Notice: Subject to any disclaimer, the term of this patent is extended or adjusted under 35 U.S.C. 154(b) by 337 days.

(21) Appl. No.: 15/050,533

(22) Filed: Feb. 23, 2016

(65) Prior Publication Data

US 2016/0248123 A1    Aug. 25, 2016

Related U.S. Application Data

(60) Provisional application No. 62/119,541, filed on Feb. 23, 2015, provisional application No. 62/222,524, filed on Sep. 23, 2015.

(51) Int. Cl.
*H02J 7/00* (2006.01)
*H01M 10/42* (2006.01)
(Continued)

(52) U.S. Cl.
CPC ......... *H01M 10/425* (2013.01); *H01M 2/022* (2013.01); *H01M 2/1022* (2013.01);
(Continued)

(58) Field of Classification Search
USPC ........ 320/112, 101, 106, 107, 110, 111, 116, 320/114, 127, 162
See application file for complete search history.

(56) References Cited

U.S. PATENT DOCUMENTS 4,064,447 A    12/1977 Edgell et al.
5,567,176 A *  10/1996 Chiou ................ G06F 1/263
                                              307/150
(Continued)

FOREIGN PATENT DOCUMENTS

JP    2001291500 A    10/2001
WO      03096472 A1   11/2003

OTHER PUBLICATIONS

EP Search Report dated Jun. 7, 2016.
EP Office Action dated Oct. 25, 2017 issued in corresponding EP patent application No. 16156877.9.

*Primary Examiner* — Brian Ngo
(74) *Attorney, Agent, or Firm* — Michael Aronoff

(57) ABSTRACT

A battery pack including a battery cell assembly, the battery cell assembly having a battery cell with a first end and a second end. A circuit board is adjacent to the battery cell and extending from the first end to the second end. A first electrical connector is disposed at the first end and connects a first end of the circuit board to the first end of the battery cell. A second electrical connector is disposed at the second end and connects a second end of the circuit board to the second end of the battery cell. A third electrical connector is disposed at the first end of the circuit board, the third electrical connector can be electrically connected to a powered device so that power from the battery cell may be provided to the powered device through the third electrical connector. A housing houses the battery cell assembly.

20 Claims, 32 Drawing Sheets

(51) Int. Cl.
*H01M 2/10* (2006.01)
*H01M 2/02* (2006.01)
*H01M 2/20* (2006.01)
*H01M 10/0525* (2010.01)

(52) U.S. Cl.
CPC ....... *H01M 2/204* (2013.01); *H01M 10/0525* (2013.01); *H01M 2220/30* (2013.01); *H01M 2250/30* (2013.01); *Y02B 90/18* (2013.01)

(56) References Cited

U.S. PATENT DOCUMENTS

| | | | |
|---|---|---|---|
| 5,718,985 A | 2/1998 | Karasa et al. | |
| 5,736,271 A * | 4/1998 | Cisar | H01M 2/1055 361/730 |
| 5,912,092 A | 6/1999 | Maruyama et al. | |
| 6,175,624 B1 * | 1/2001 | Brundieck | H04M 1/0262 379/433.05 |
| 6,404,168 B1 | 6/2002 | Shoji | |
| 6,586,906 B1 * | 7/2003 | Bessa | H02J 7/355 320/101 |
| 7,394,220 B2 * | 7/2008 | Huang | H02J 7/0045 320/107 |
| 7,550,213 B2 | 6/2009 | Wheeler et al. | |
| D623,601 S | 9/2010 | Harrison | |
| D627,204 S | 11/2010 | Harrison et al. | |
| D627,246 S | 11/2010 | Harrison et al. | |
| 8,058,840 B2 | 11/2011 | Daniel et al. | |
| 8,461,805 B2 | 6/2013 | Sa et al. | |
| 8,547,061 B1 * | 10/2013 | Wong | H02J 7/0027 320/112 |
| 2002/0182929 A1 * | 12/2002 | Chang | H01M 10/4257 439/500 |
| 2005/0271934 A1 * | 12/2005 | Kiger | H01M 2/105 429/159 |
| 2006/0108979 A1 * | 5/2006 | Daniel | H01M 2/105 320/112 |
| 2006/0170393 A1 * | 8/2006 | Yang | H02J 7/0042 320/107 |
| 2006/0267547 A1 | 11/2006 | Godovich et al. | |
| 2007/0241721 A1 * | 10/2007 | Weinstein | H01M 2/1022 320/114 |
| 2007/0273327 A1 * | 11/2007 | Daniel | H01M 2/105 320/110 |
| 2008/0112120 A1 * | 5/2008 | Huang | G06F 1/1616 361/679.41 |
| 2008/0252253 A1 * | 10/2008 | Tsai | H02J 7/0008 320/106 |
| 2009/0079392 A1 * | 3/2009 | Wu | H01M 2/1055 320/127 |
| 2009/0189541 A1 * | 7/2009 | Crawford | F21L 4/02 315/294 |
| 2010/0190052 A1 | 7/2010 | Rajani et al. | |
| 2010/0221592 A1 | 9/2010 | Rejman et al. | |
| 2011/0162221 A1 * | 7/2011 | Knoke | G01B 11/03 33/228 |
| 2012/0037385 A1 | 2/2012 | Suzuki et al. | |
| 2012/0308849 A1 | 12/2012 | Tortstensson et al. | |
| 2013/0115482 A1 * | 5/2013 | Yi | H01M 2/1055 429/7 |
| 2013/0224532 A1 | 8/2013 | Bengtsson et al. | |
| 2013/0343042 A1 | 12/2013 | Windom et al. | |
| 2016/0093926 A1 * | 3/2016 | Wright | H01M 2/1022 320/162 |
| 2016/0094069 A1 * | 3/2016 | Park | H02J 7/0042 362/183 |
| 2016/0268641 A1 * | 9/2016 | Baek | B62M 6/90 |
| 2017/0062794 A1 * | 3/2017 | Lee | H01M 10/425 |
| 2017/0085117 A1 * | 3/2017 | Ota | H02J 7/025 |
| 2017/0271721 A1 * | 9/2017 | Cho | H01M 10/425 |
| 2017/0279301 A1 * | 9/2017 | Iwatsuki | H02J 9/061 |

* cited by examiner

BATTERY CHARGER AND METHOD OF CHARGING A BATTERY

CROSS-REFERENCE TO RELATED APPLICATIONS

This application claims priority to U.S. Provisional Application No. 62/119,541, filed on Feb. 23, 2007 and U.S. Provisional Application No. 62/222,524, filed on Sep. 23, 2015. The disclosures of the above applications are incorporated herein by reference.

FIELD OF THE INVENTION

The present invention relates to a battery pack and a system of devices powered by the battery pack.

BACKGROUND

There are a variety of devices which are powered by electricity and, particularly, are battery powered. It is desired to provide a battery pack for efficiently providing power to the devices and a system of devices which uses the battery pack.

SUMMARY

According to one aspect of the disclosure, a system includes a battery pack and at least one device powered by the battery pack. The battery pack includes a battery cell assembly, the battery cell assembly including a battery cell having a first end and a second end; a circuit board adjacent to the battery cell and extending from the first end to the second end; a first electrical connector disposed at the first end and connecting the first end of the circuit board to the first end of the battery cell; a second electrical connector disposed at the second end and connecting the second end of the circuit board to the second end of the battery cell; a third electrical connector disposed at the first end, the third electrical connector being configured to be electrically connected to a powered device so that power from the battery cell may be provided to the powered device through the third electrical connector; and a housing which houses the battery cell assembly.

The battery pack may further include a fourth electrical connector disposed at the second end, the fourth electrical connector being configured to be connectable to a charging source so that a charge can be provided to the battery cell through the fourth electrical connector.

The circuit board may be flat.

The circuit board may have a rectangular shape.

The housing may include an opening through which the third electrical connector can be accessed.

The housing may include an opening through which the fourth electrical connector can be accessed.

The fourth electrical connector may include at least one of a USB and a micro-USB port.

The housing may include a first end portion adjacent to the first end of the battery cell and the first end of the circuit board and wherein the first end is flat.

The housing may include a circuit board side adjacent to the circuit board, the circuit board side of the housing having a rectangular shape and covering the circuit board.

The first end portion may be flat and perpendicular to the circuit board side of the housing.

The circuit board side of the housing may be flat.

The third electrical connector may include a pair of electrical connectors.

The third electrical connector may include a pair of clips.

A receiver coil may be mounted on the circuit board to provide for wireless charging of the battery cell.

According to another aspect, there is a battery pack including a battery cell assembly, battery cell assembly including a battery cell having a first end and a second end, a circuit board adjacent to the battery cell and extending from the first end to the second end, a first electrical connector disposed at the first end and connecting the first end of the circuit board to the first end of the battery cell, a second electrical connector disposed at the second end and connecting the second end of the circuit board to the second end of the battery cell, a third electrical connector disposed at the first end, the third electrical connector being configured to be electrically connected to a powered device so that power from the battery cell may be provided to the powered device through the third electrical connector; and a housing which houses the battery cell assembly.

The battery pack may also include fourth electrical connector disposed at the second end, the fourth electrical connector being connectable to a charging source so that a charge can be provided to the battery cell through the fourth electrical connector.

The circuit board may be flat.

The circuit board may be rectangular shaped.

The housing may include an opening through which the third electrical connector can be accessed.

The housing may include an opening through which the fourth electrical connector can be accessed.

The fourth electrical connector may include at least one of a USB and a micro-USB port.

The housing may include a first end portion adjacent to the first end of the battery cell and the first end of the circuit board and wherein the first end is flat.

The housing may include a circuit board side adjacent to the circuit board, the circuit board side of the housing having a rectangular shape and covering the circuit board.

The first end portion may be flat and perpendicular to the circuit board side of the housing.

The circuit board side of the housing may be flat.

The third electrical connector may include a pair of electrical connectors.

The third electrical connector may include a pair of clips.

A receiver coil may be mounted on the circuit board to provide for wireless charging of the battery cell.

According to another aspect, there is a battery pack including a battery cell assembly, the battery cell assembly including a battery cell having a first end and a second end; a circuit board adjacent to the battery cell and extending from the first end to the second end; a first electrical connector disposed at the first end and connecting the first end of the circuit board to the first end of the battery cell; a second electrical connector disposed at the second end and connecting the second end of the circuit board to the second end of the battery cell; a third electrical connector disposed at the first end, the third electrical connector being configured to be electrically connected to a powered device so that power from the battery cell may be provided to the powered device through the third electrical connector. A housing houses the battery cell assembly.

The battery pack may further include a fourth electrical connector disposed at the second end, the fourth electrical connector being configured to be connectable to a charging source so that a charge can be provided to the battery cell through the fourth electrical connector.

The third electrical connector may include a pair of adjacent electrical connectors which provide a positive and negative electrode.

The battery cell may have one of a positive electrode and a negative electrode at the first end and the other of a positive electrode and a negative electrode at the second end.

The housing may include a first opening through which the third electrical connector can be accessed and a second opening through which the fourth electrical connector can be accessed.

The housing may include a first end portion adjacent to the first end of the battery cell and the first end of the circuit board.

The housing may include a circuit board side adjacent to the circuit board, the circuit board side of the housing having a rectangular shape and covering the circuit board.

The circuit board may have a width Y and the battery cell has a width D and the width Y may be 120% or less of the width D.

The housing may have a primary width A and the primary width A may be 130% or less of the width D and 130% or less of the width Y.

The circuit board may be flat.

The battery cell may be cylindrical.

A receiver coil may be mounted on the circuit board to provide for wireless charging of the battery cell.

The circuit board may include one or more cut-outs to accommodate an electrical connector.

The circuit board may include a pair of cut-outs.

The cut-outs may accommodate the third electrical connector.

An end of the circuit board may extend as far as or beyond the third electrical connector.

The third electrical connector may extend beyond an end of the circuit board by a limited amount.

The third electrical connector may extend beyond an end of the circuit board by 50 mm or less.

The third electrical connector may extend beyond an end of the circuit board by 25 mm or less.

The third electrical connector may extend beyond an end of the battery cell by a limited amount.

The third electrical connector may extend beyond an end of the battery cell by 50 mm or less.

The third electrical connector may extend beyond an end of the battery cell by 25 mm or less.

According to another aspect, there is a battery pack including a battery cell having a first end and a second end; an input electrical connector disposed adjacent the first end, the input electrical connector being configured to be connectable to a charging source so that a charge can be provided to the battery cell through the fourth electrical connector so as to charge the battery cell; an output electrical connector disposed at the second end and being configured to be electrically connected to a powered device so that power from the battery cell may be provided to a powered device through the output electrical connector. A housing houses the battery cell.

A width of the housing may be 130% or less of a width of the battery cell.

The output electrical connector may include a pair of adjacent electrical connectors which provide a positive and negative electrode.

The battery cell may have one of a positive electrode and a negative electrode at the first end and the other of a positive electrode and a negative electrode at the second end.

The housing may include a first opening through which the output electrical connector can be accessed and a second opening through which the input electrical connector can be accessed.

The circuit board may be flat and the battery cell may be cylindrical.

According to another aspect, there is a system including a battery pack and at least one device selectively engaged with and powered by the battery pack. The battery pack may include a battery cell assembly. The battery cell assembly may include a battery cell having a first end and a second end, a circuit board adjacent to the battery cell and extending from the first end to the second end, a first electrical connector disposed at the first end and connecting the first end of the circuit board to the first end of the battery cell, a second electrical connector disposed at the second end and connecting the second end of the circuit board to the second end of the battery cell, a third electrical connector disposed at the first end, the third electrical connector being configured to be electrically connected to a powered device so that power from the battery cell may be provided to the powered device through the third electrical connector. A housing may house the battery cell assembly.

The battery pack may further include a fourth electrical connector disposed at the second end, the fourth electrical connector being configured to be connectable to a charging source so that a charge can be provided to the battery cell through the fourth electrical connector.

The housing may further include a first end portion adjacent to the first end of the battery cell and the first end of the circuit board.

The first end portion may be configured to be inserted into the at least one device.

The at least one device may include at least three devices.

According to another aspect, there is a battery pack including a battery cell assembly, the battery cell assembly including a battery cell having a first end and a second end; a circuit board adjacent to the battery cell and extending from the first end to the second end; a first electrical connector disposed at the first end and connecting the first end of the circuit board to the first end of the battery cell; a second electrical connector disposed at the second end and connecting the second end of the circuit board to the second end of the battery cell. A housing houses the battery cell assembly. A receiver coil is mounted to the circuit board and is configured to charge the battery cell.

The battery pack may include only a single cell.

The battery pack may include a third electrical connector disposed at the first end, the third electrical connector being configured to be electrically connected to a powered device so that power from the battery cell may be provided to the powered device through the third electrical connector.

The third electrical connector may include a pair of adjacent electrical connectors which provide a positive and negative electrode.

The battery cell may have one of a positive electrode and a negative electrode at the first end and the other of a positive electrode and a negative electrode at the second end.

The housing may include a first opening through which the third electrical connector can be accessed and a second opening through which the fourth electrical connector can be accessed.

The housing may include a first end portion adjacent to the first end of the battery cell and the first end of the circuit board.

The housing may include a circuit board side adjacent to the circuit board, the circuit board side of the housing having a rectangular shape and covering the circuit board.

The circuit board may have a width Y and the battery cell has a width D and the width Y may be 120% or less of the width D.

The housing may have a primary width A and the primary width A may be 130% or less of the width D and 130% or less of the width Y.

The circuit board may be flat.

The battery cell may be cylindrical.

DETAILED DESCRIPTION OF EXEMPLARY EMBODIMENTS OF THE INVENTION

Figure 1:
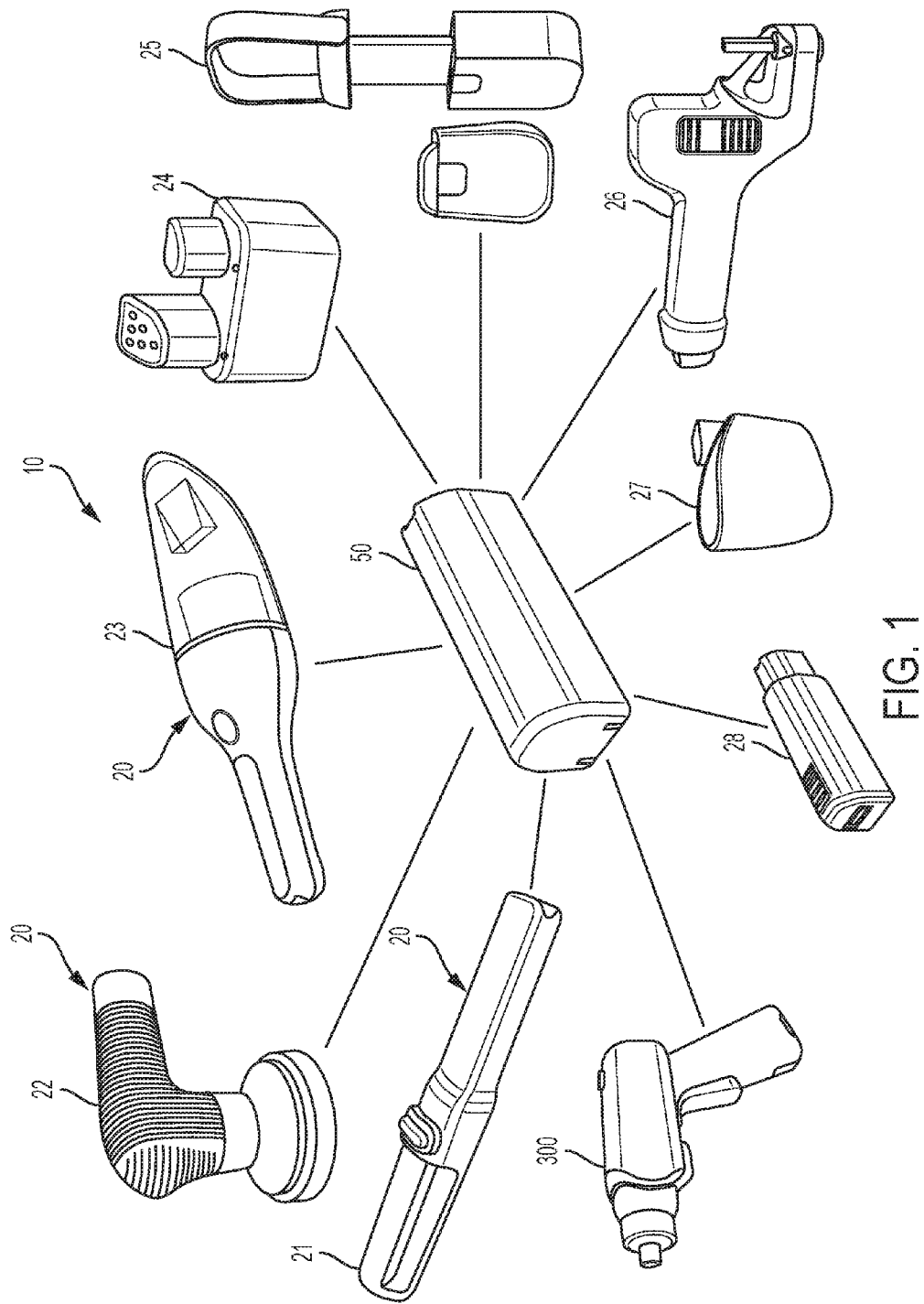
FIG. 1 illustrates a system according to an exemplary embodiment of the invention.

An exemplary embodiment of the present application relates to a battery pack and to a system of battery powered devices powered by the battery pack. The system is generally indicated by reference numeral 10 in FIG. 1. The system 10 can include, for example, one or more battery powered devices 20, a battery pack 50, and a battery pack charging block 200 (see FIG. 15). Each of the battery powered devices 20 can be any of a variety of devices that can be powered by a battery, including, for example, drills, drill/drivers, hammer drill/drivers, rotary hammers, screwdrivers, impact drivers, saws, jigsaws, reciprocating saws, cutoff tools, cutout tools, shears, sanders, vacuums, lights, routers, adhesive dispensers, lasers, staplers, nailers, flashlight, paper shredder, scrubbing brush, speakers, headphones, vacuums, USB charger and the like. FIG. 1 illustrates a number of powered devices 20 including a paper shredder 21; scrubber 22, hand-held vacuum 23; flashlight kit 24; collapsible LED light 25; inflator 26; wireless speaker 27; USB charger/power source 28 and screwdriver 300.

Figure 2:
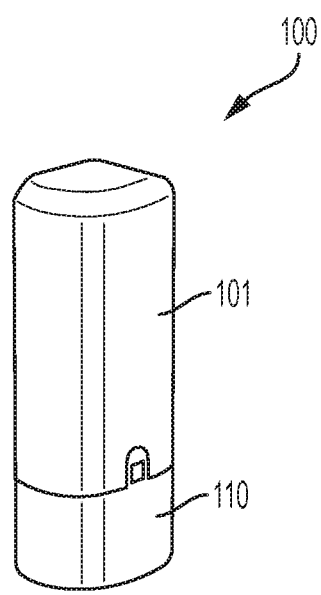
FIG. 2 illustrates a battery pack according to an exemplary embodiment of the invention.
Figure 3:
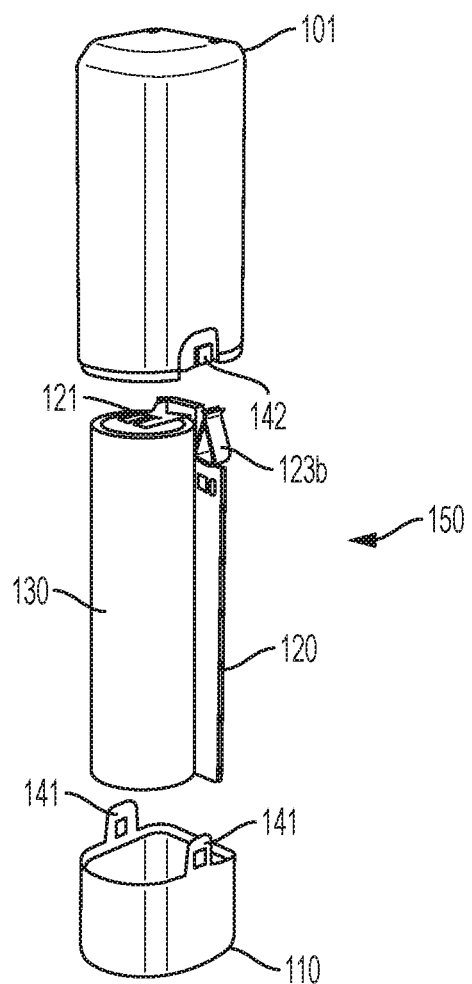
FIG. 3 illustrates the exemplary embodiment of the battery pack with the housing removed.
Figure 4:
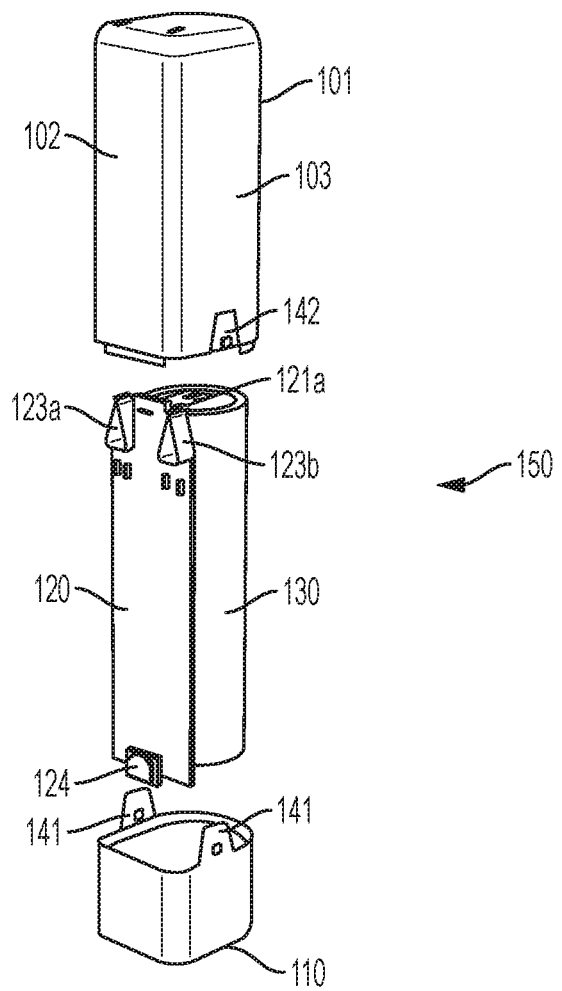
FIG. 4 illustrates another view of the exemplary embodiment of the battery pack with the housing removed.

FIGS. 2-14 illustrate an exemplary embodiment of a battery pack 50 according to the present application. FIG. 2 shows the battery pack 50 in an assembled state. FIGS. 3 and 4 are exploded views showing the battery pack housing 100 separated from the battery cell assembly 150. As shown in these figures, the battery pack 50 consists of a battery cell assembly 150 housed in a battery pack housing 100.

FIGS. 5A-5D and 6 illustrate the battery pack 50 with the battery pack housing 100 removed to illustrate the members of the battery cell assembly 150. As shown in these figures, the battery cell assembly 150 includes a battery cell 130. The battery cell 130 may include any of the generally known chemistries, including lithium-ion (Li-ion) or nickel-cadmium (Ni-Cad). The battery cell 130 is generally cylindrical in shape and has an electrode at each end, one end serving as a positive electrode and the other end serving as a negative electrode. A generally flat and rectangular circuit board 120 is disposed adjacent to the battery cell 130. The circuit board has a pair of tabs 121a and 121b, one tab at each end. These tabs 121a, 121b, one tab electrically connect the circuit board 120 to the positive and negative electrodes, respectively, of the battery cell 130.

As shown in FIGS. 3-6, the circuit board further has a pair of electrical connectors 123a, 123b at one end and a third electrical connector 124 at the other end. In the exemplary embodiment, the electrical connectors 123a, 123b are in the form of tulip connectors. These connectors 123 connect with the selected battery powered device 20 in order to provide electrical power to the device 20. A first connector 123a serves as a positive electrode and a second connector 123b serves as a negative electrode of the board 120 for providing power to a selected battery powered device 20 being powered by the battery pack 50. As can be appreciated, the tabs 121a, 121b are connected to opposite ends of the battery cell 130 and thus, the positive and negative electrodes of the battery cell 130. These tabs 121a, 121b are connected to the board 120 as are the electrical connectors 123. This allows the electrical connectors 123 to serve as positive and negative electrodes of the board 120. The positive electrical connector 123a is electrically connected to the first (positive) tab 121a which is electrically connected to the positive electrode of the cell 130. The negative electrical connector 123b is electrically connected the second (negative) tab 121b which is electrically connected to the negative electrode of the cell 130. According to this exemplary embodiment, although the battery cell has positive and negative electrodes at opposite ends, the battery pack 50 can provide positive and negative electrodes adjacent to one another at the same end of the battery pack 50.

As can be appreciated, the circuit board 120 has cut-outs to accommodate the electrical connectors 123. Because the electrical connectors 123 are received in the cut-outs, the connectors 123 do not extend beyond an end 131 of the circuit board 120 (see FIG. 5B). In other embodiments, the connectors 123 may extend beyond the end 131 of the circuit board 120, but only to a limited degree. For example, the connectors 123 may extend beyond the end 131 of the circuit board 120 by 50 mm or less or 25 mm or less. Additionally, the connectors 123 only slightly extend beyond an end of the battery cell 130. Particularly, the connectors may extend beyond an end of the battery cell 130 by 50 mm or less or 25 mm or less.

The third electrical connector 124 is configured to receive power for charging the battery cell 130. In the exemplary embodiment, the third electrical connector 124 is in the form of a micro-USB port. However, other connectors, such as a standard USB port, are contemplated. Like the pair of electrical connectors 123, the third electrical connector 124 is connected to the positive and negative electrodes of the battery cell 130 through the circuit board 120. The present exemplary embodiment allows power to be provided for charging the battery pack 50 at an end opposite the end at which the battery pack 50 provides power.

As shown in FIGS. 5A-5D, the circuit board has a thickness T, a length X and a width Y. The battery cell 130 has a length L and a width D. In the exemplary embodiment, the battery cell 130 is cylindrical and has a circular cross section. Accordingly, the width D is equal to the diameter of the battery cell 130.

In an exemplary embodiment, the circuit board 120 may have a length X similar to a length L of the battery cell 130. This allows for the circuit board 120 to extend from end to end of the battery cell 130 and at the same time still provide for a compact battery pack 50. Specifically, in exemplary embodiments, the length X may be 70-140% of the length L; the length X may be 80-130% of the length L; the length X may be 90-120% of the length L; the length X may be 90-110% of the length L; or the length X may be 100-120% of the length L.

Figure 5A:
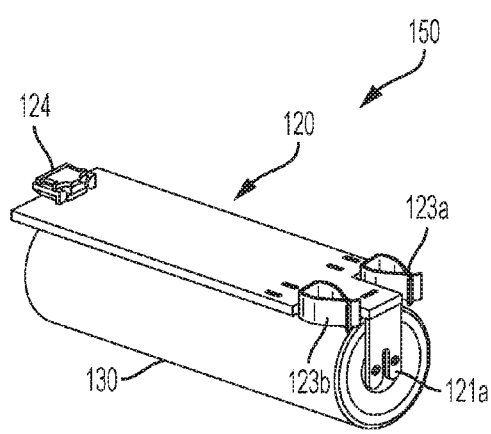
FIGS. 5A-5D illustrates various views of an exemplary embodiment of the battery cell assembly.
Figure 5B:
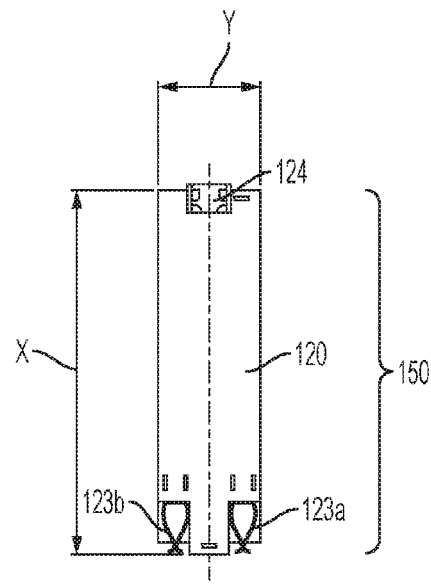
Figure 5C:
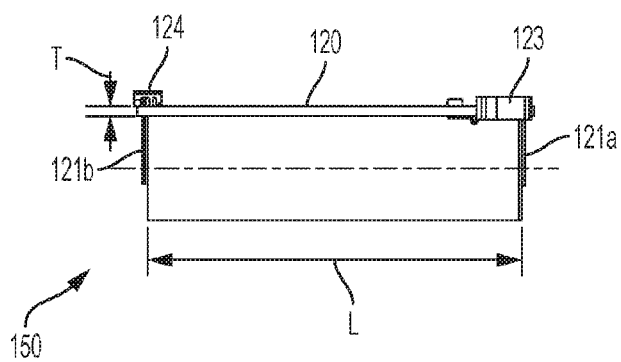
Figure 5D:
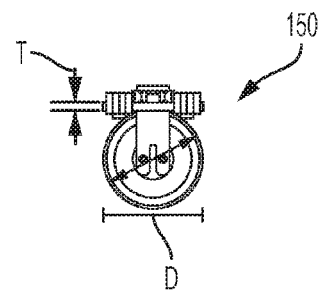
Figure 6:
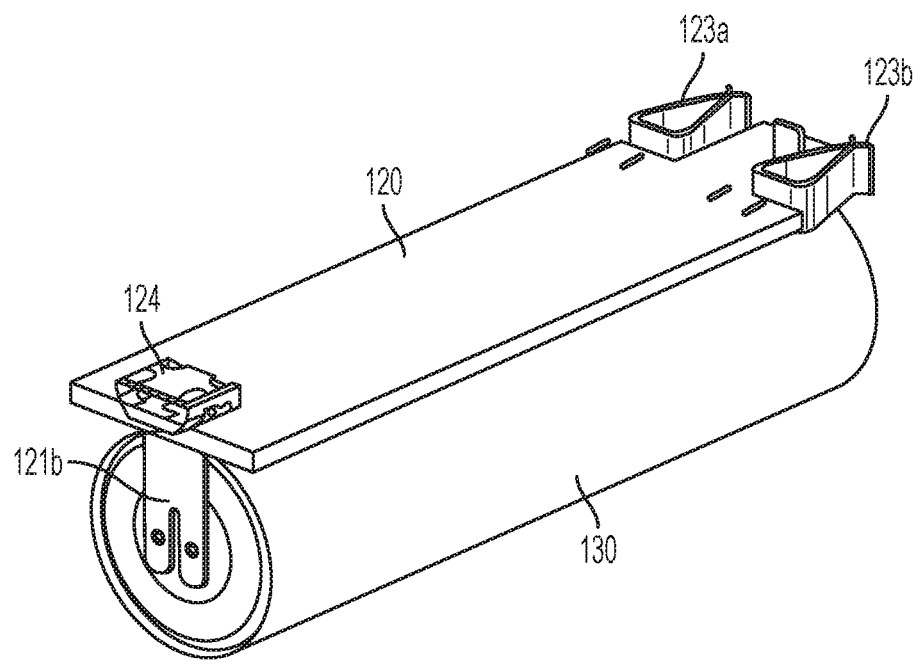
FIG. 6 illustrates another view of an exemplary embodiment of the battery cell assembly.
Figure 7:
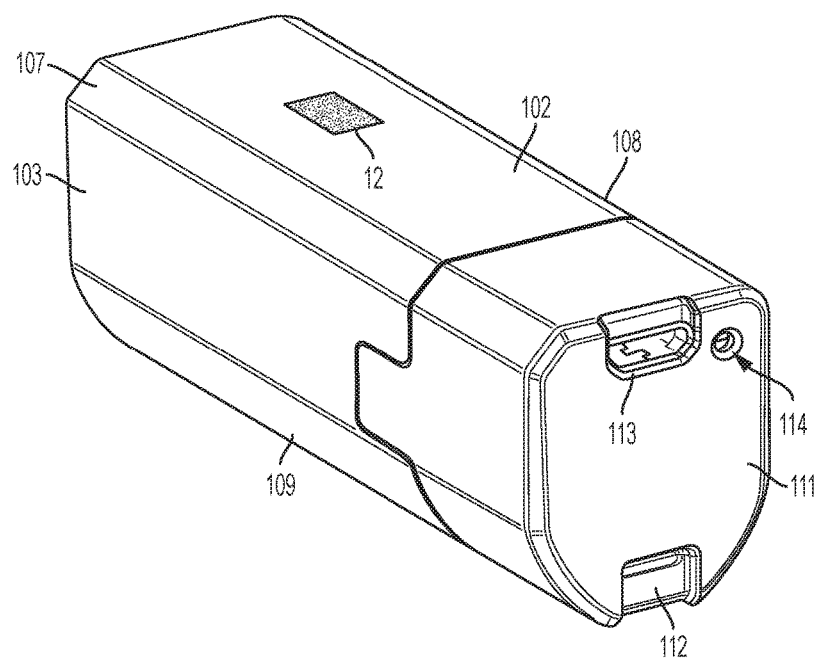
FIG. 7 illustrates another view of the exemplary embodiment of the battery pack.

As shown in FIG. 5C, the circuit board 120 may extend beyond either or both ends of the battery cell 130. This may be advantageous in allowing the circuit board 120 to connect to the ends of the battery cell 130 through the tabs 122.

Additionally, according to the exemplary embodiment, the circuit board 120 may have a width Y that is similar to the width D of the battery cell 130. For example, the width Y of the circuit board may be 70-130% of the width D of the battery cell 130; the width Y may be 80-120% of the width D; the width Y may be 90-110% of the width D; or the width Y may be 95-105% of the width D. When the width Y of the circuit board 120 is similar to the width D of the battery cell 130, the circuit board 120 can be large without unduly increasing the width or overall size of the battery pack 50.

The circuit board 120 may also be constructed so that its width Y is not more than slightly larger than the width D of the battery cell. For example, the width Y may be 120% or less of the width D; the width Y may be 110% or less of the width D; or the width Y may be 105% or less of the width D. In these examples, the width Y may be significantly less than the width D, such as for example, half the width D. When the circuit board 120 is so constructed that its width Y is not more than slightly larger than the width D of the battery cell, the circuit board 120 does not unduly increase the width or overall size of the battery pack 50.

The thickness T of the circuit board 120 may be small in comparison to the length X or width Y. For example, the thickness T may be less than 30% of the width Y or less than 20% of the width Y. It may also be less than 10% of the length X or less than 5% of the length X.

Figure 10:
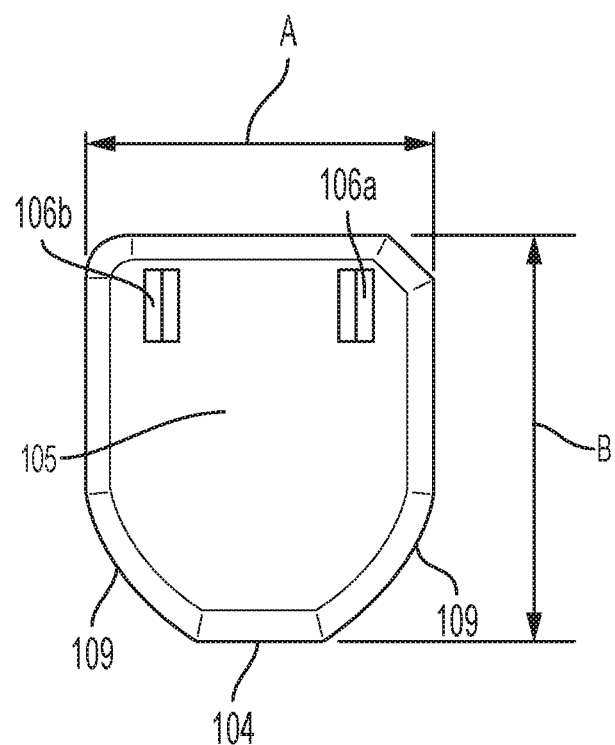
FIG. 10 illustrates another view of the exemplary embodiment of the battery pack.
Figure 11:
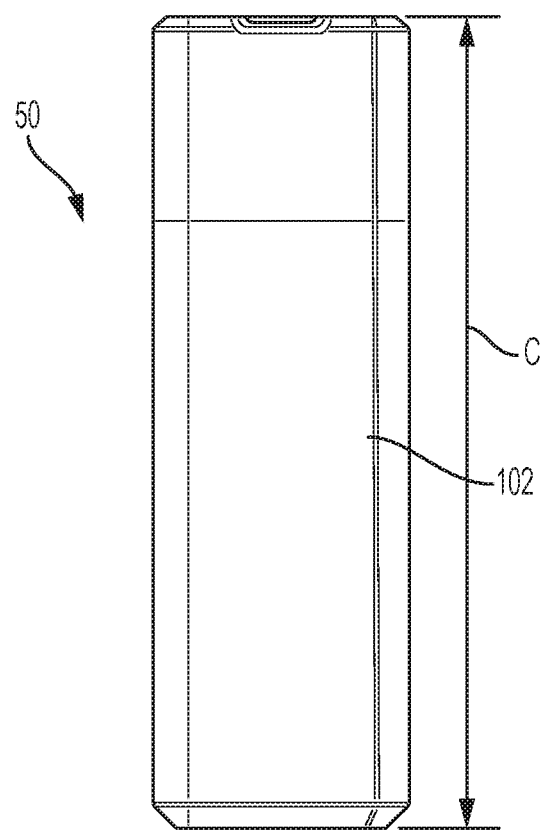
FIG. 11 illustrates another view of the exemplary embodiment of the battery pack.
Figure 12:
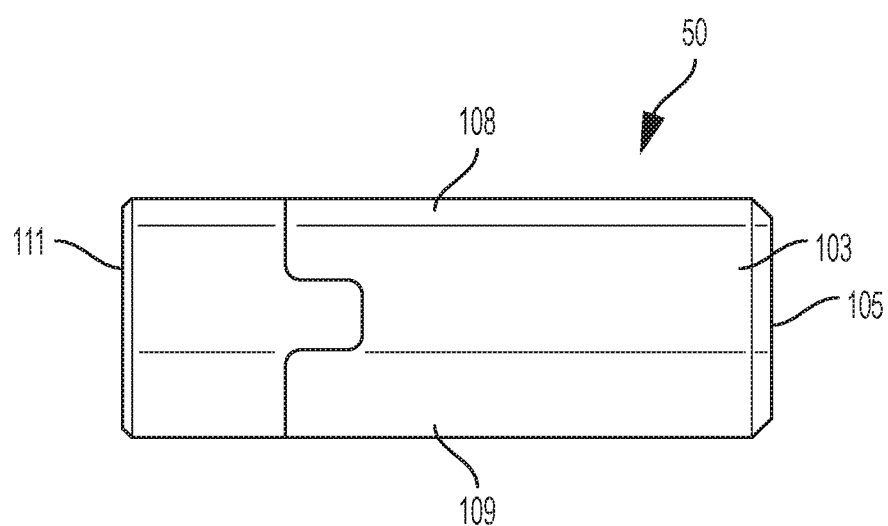
FIG. 12 illustrates another view of the exemplary embodiment of the battery pack.
Figure 13:
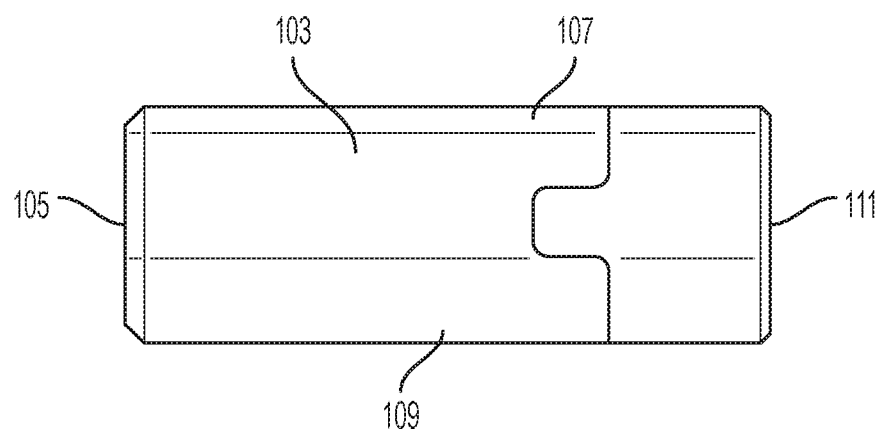
FIG. 13 illustrates another view of the exemplary embodiment of the battery pack.
Figure 14:
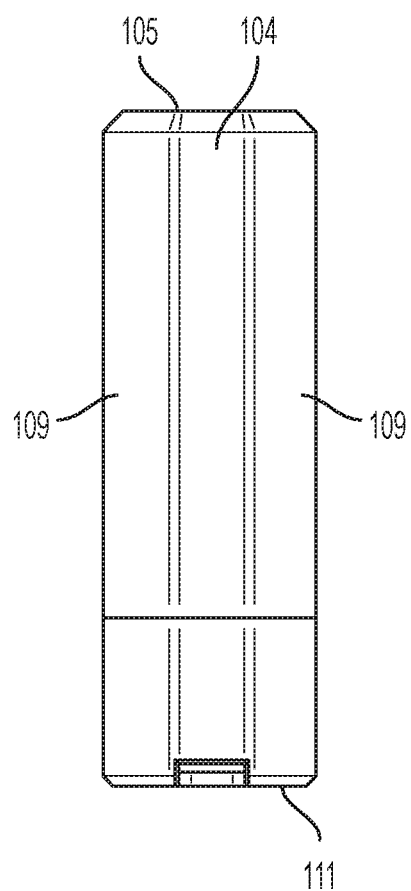
FIG. 14 illustrates another view of the exemplary embodiment of the battery pack.

As shown in FIGS. 10 and 11, the battery pack 50 has a primary width A, a primary thickness B and a primary length C. According to the exemplary embodiment, the battery pack 50 may include a battery cell 130 and a circuit board 120 while maintaining a compact size. Specifically, the primary width A may be only slightly greater than the width D of the battery cell 130 or the width Y of the circuit board 120, whichever is greater. For example, the width A of the battery pack 50 may be 130% or less of the width D; 120% or less of the width D; or 110% or less of the width D, but no less than width D or width Y, whichever is greater. Additionally, the width A may be 130% or less of the width Y; 120% or less of the width Y; or 110% or less of the width Y, but no less than width D or width Y, whichever is greater. Similarly, the primary thickness B of the battery pack 50 may be only slightly greater than the width D of the battery cell 130 plus the thickness T of the circuit board 120. For example, the thickness B of the battery pack 50 may be 140% or less of the width D plus thickness T; 130% or less of the width D plus thickness T; or 115% or less of the width D plus thickness T, but no less than width D plus thickness T. Likewise, the length C may be may be only slightly greater than the length L of the battery cell 120 or the length X of the circuit board 130, whichever is greater. For example, the length C of the battery pack 50 may be 130% or less of the length L; 120% or less of the length L; or 110% or less of the length L, but no less that length L or the length X, whichever is greater. Additionally, the length C may be 130% or less of the length X; 120% or less of the length X; or 110% or less of the length X, but no less than length X or length L, whichever is greater.

According to exemplary embodiments, the battery pack 50 may include a battery cell 130 and a circuit board 120 while maintaining compactness in one or more of various dimensions, as described above. This allows a battery pack which maximizes the power provided by a battery cell 130, while at the same time allowing for electrical components to be provided on the circuit board 120 in a compact package.

Turning to the battery pack housing 100, it consists of a top housing 101 and a bottom housing 110, as shown in, for example, FIGS. 2-4. The bottom housing 110 includes a pair of engagement portions 141 and the top housing 101 includes a pair of engagement portions 142. These portions 141, 142 engage with each other to secure the bottom housing 110 and the top housing 101 together. The housing 100 may be made of a plastic material.

Figure 8:
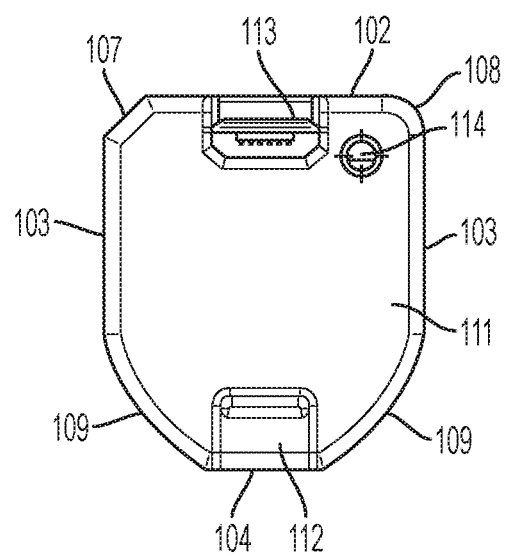
FIG. 8 illustrates another view of the exemplary embodiment of the battery pack.
Figure 9:
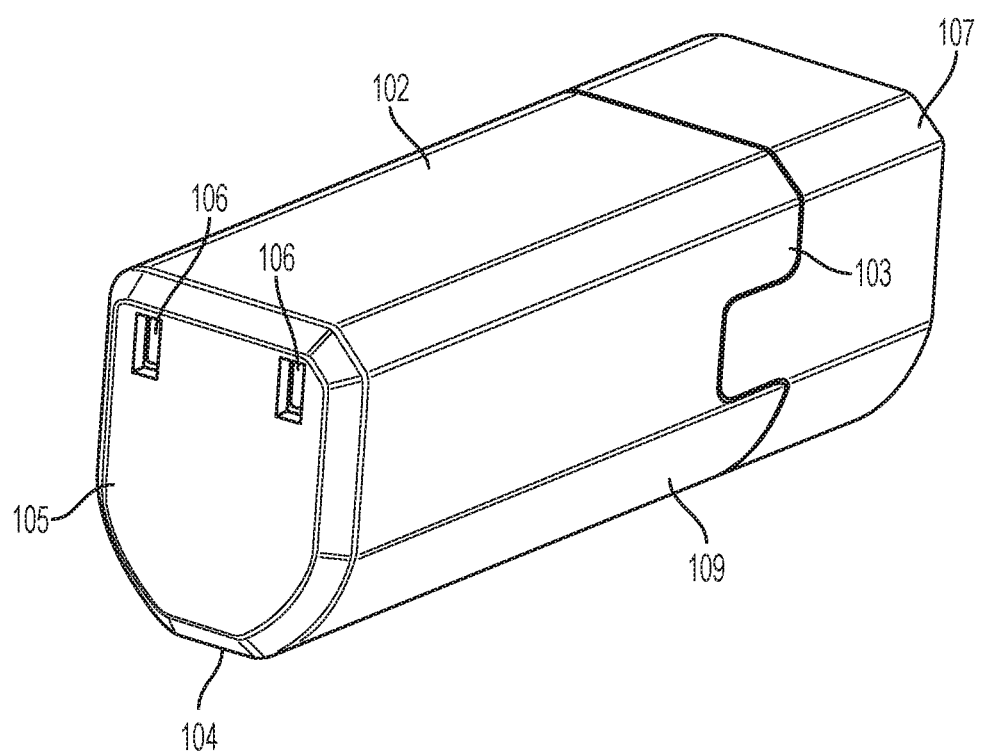
FIG. 9 illustrates another view of the exemplary embodiment of the battery pack.

As shown in FIGS. 5-14, the battery pack housing 100 includes a circuit board side 102 which is adjacent to and spans the length of the circuit board 120. The circuit board side 102 is generally flat and rectangular to match the general shape of the circuit board 120. The battery pack housing 100 further includes a pair of side walls 103 which are generally perpendicular to the circuit board side 102. It also includes a front face 104 which is generally parallel to the circuit board side 102 and perpendicular to the side walls 103. The circuit board side 102 and the side walls 103 are connected by chamfered corners 107 and 108. As best seen in FIG. 8, chamfered corner 107 may be made a different size and or shape than chamfered corner 108 so that the corners 107 and 108 are not symmetrical. The flat chamfered corner 107 may provide for insertion guidance of the battery pack 50 into a powered device 20. Additionally, because it has a different shape than chamfered corner 108, it may be used to insert the battery pack 50 in the appropriate orientation.

The battery pack housing 100 further includes a pair of rounded corners 109. In the exemplary embodiment, the rounded corners 109 are symmetrical to one another. However, they may be made a different size and/or shape so that the corners 109 are not symmetrical to one another. It is noted that the chamfered corners 107 and 108 are not the same size and shape as the corners 109. Accordingly, the battery pack can only be inserted into the devices 20 in one orientation. That is, the chamfered corners 107 and 108 would not fit into the recesses in the devices 20 provided to fit the corners 109.

The top housing 101 also includes a top surface 105. The top surface includes a pair of openings 106 through which the connectors 123 can be accessed. In this case, the connectors 123 are recessed with respect to the top surface 105 so that they are protected against damage from being dropped or the like. In an alternative embodiment, the connectors 123 may be made so that they project from the openings 106.

The bottom housing 110 includes a bottom face 111. The bottom face 111 includes an opening 113 for the micro-USB port 124. It additionally includes an LED 114. The LED 114 can be illuminated when the battery pack 50 is connected to a charging source through the micro-USB port 124. Alternatively or additionally, the LED 114 may be configured to illuminate whenever the battery pack 50 has reached a certain charge. For example, the LED 114 may be configured to illuminate when the battery cell 130 is charged to 90% or more to indicate that the battery pack 50 is nearly charged. The threshold for illuminating the LED 114 in this circumstance could be different than 90%, for example, it could be 85%, 95% or 98%. In another embodiment, the battery pack 50 may include a button 12 which is connected to the circuit board 120 by wires (not shown) and a user may illuminate the LED 114 by actuating the button 12.

The bottom face 111 includes a retention feature 112 in the form of a recess which is used to retain the battery pack 50 in the device 20 in a manner which will be described in further detail below.

Figure 15:
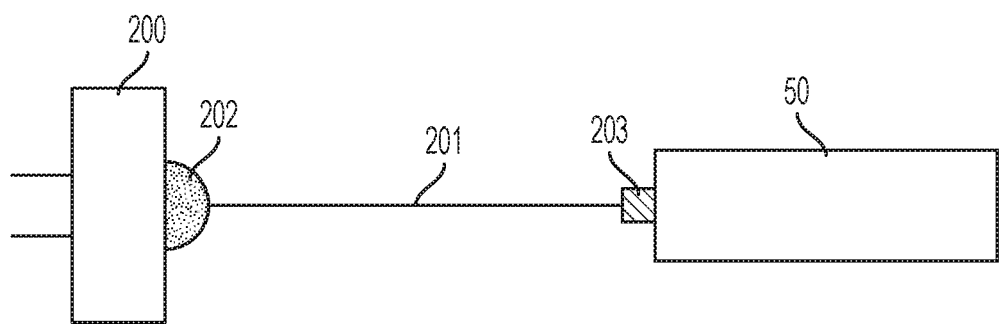
FIG. 15 illustrates an exemplary embodiment of the battery pack being charged.

FIG. 15 illustrates a battery pack 50 according to an exemplary embodiment in a charging configuration. As shown in FIG. 15, the battery pack 50 can be charged through use of a charging block 200 and a cord 201. The charging block 200 is plugged into a standard electrical outlet. The cord 201 includes a first connector 202 in the form of a USB connector and a second connector 203 in the form of a micro-USB connector. The USB connector 202 removably engages a USB port on the charging block 200 and the micro-USB connector 203 removably engages the micro-USB port 124. Accordingly, the battery pack 50 may be charged.

The exemplary embodiment shown in FIG. 15 illustrates a cord 201 with a USB connector 202 and a micro-USB connector 203. However, it is understood that other connectors are contemplated. For example, both connectors may be USB or micro-USB connectors. Alternatively, either or both of the connectors for the cord 201 may be ports instead of connectors and the charging block 200 and battery pack 50 may be adjusted accordingly. Furthermore, FIG. 15 illustrates the use of a charging block 200. It is understood that the battery pack 50 may be charged by other means. For example, the USB connector 202 of the cord 201 may be plugged into a USB port of a computer or other USB charger or power source.

Figure 16A:
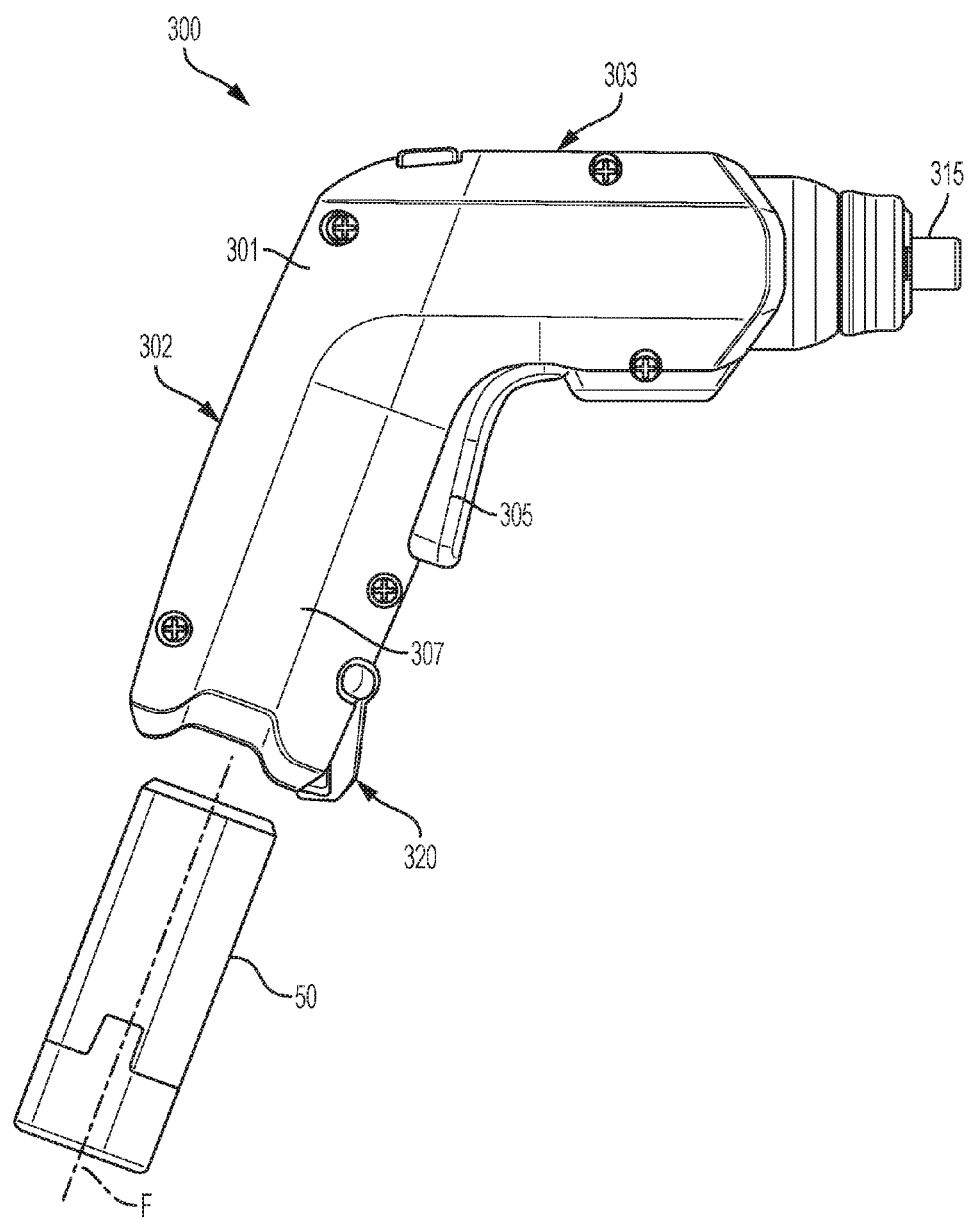
FIGS. 16A and 16B illustrate an exemplary embodiment of the battery pack and a screwdriver.
Figure 16B:
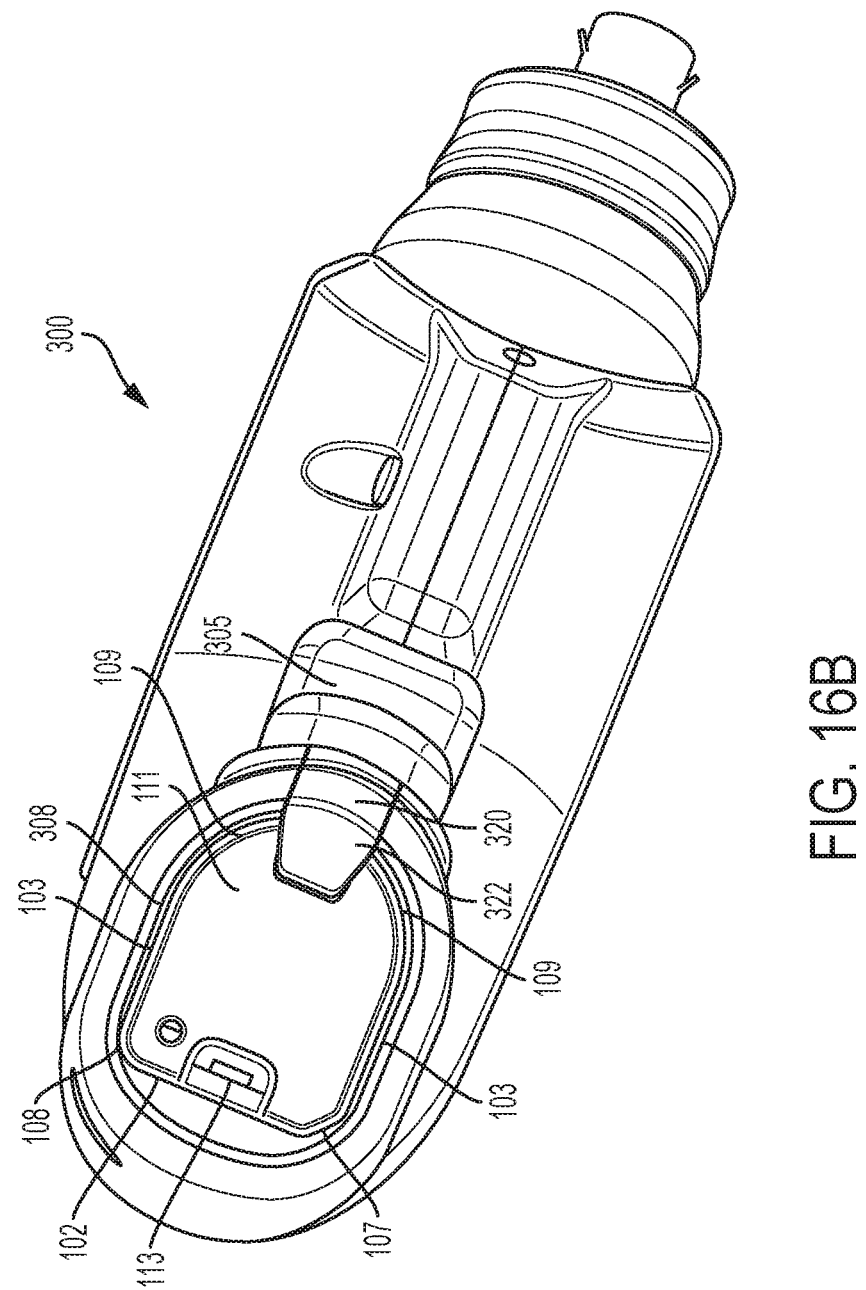
Figure 17:
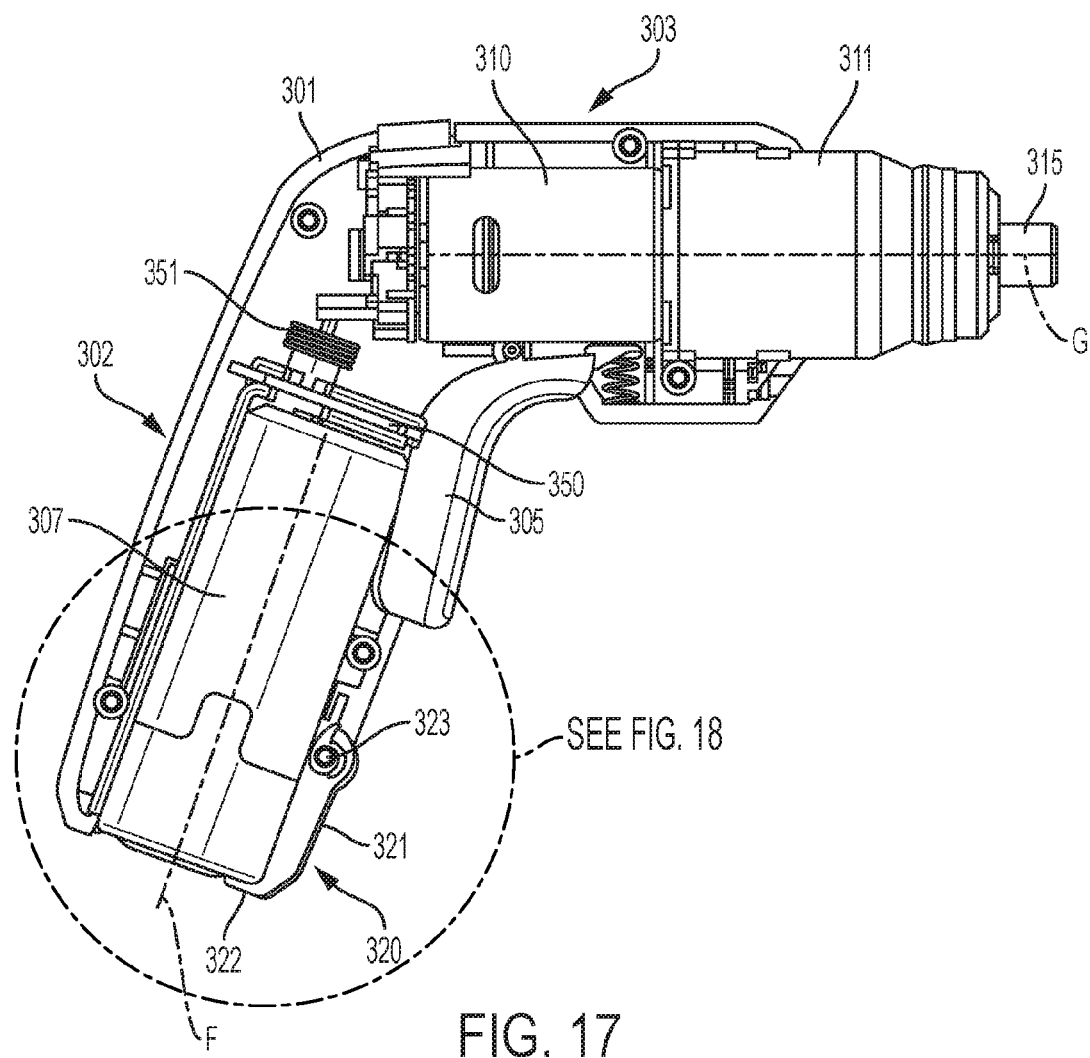
FIG. 17 illustrates another view of the exemplary embodiment of the battery pack and screwdriver.
Figure 18:
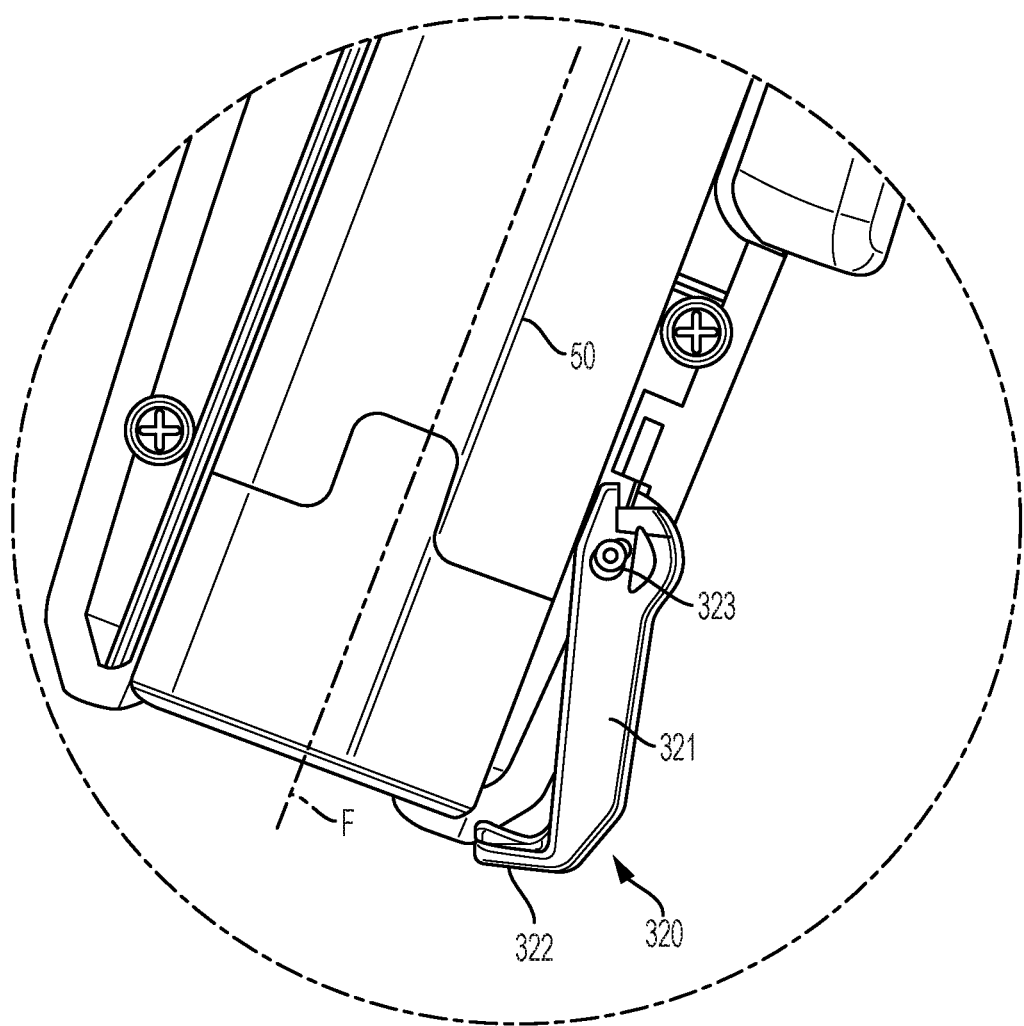
FIG. 18 illustrates another view of the exemplary embodiment of the battery pack and screwdriver.
Figure 19:
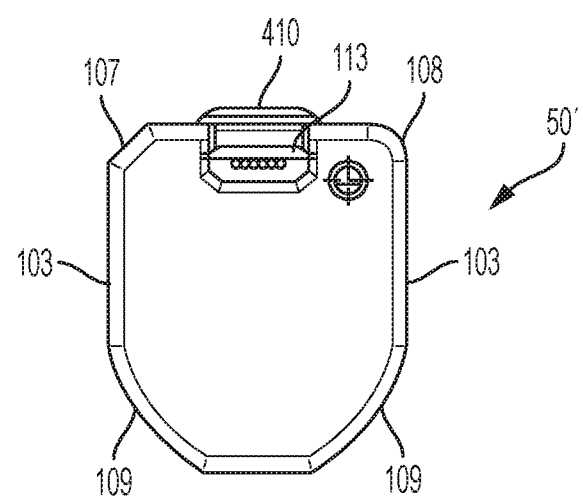
FIG. 19 illustrates another exemplary embodiment of a battery pack according to the present invention.
Figure 20:
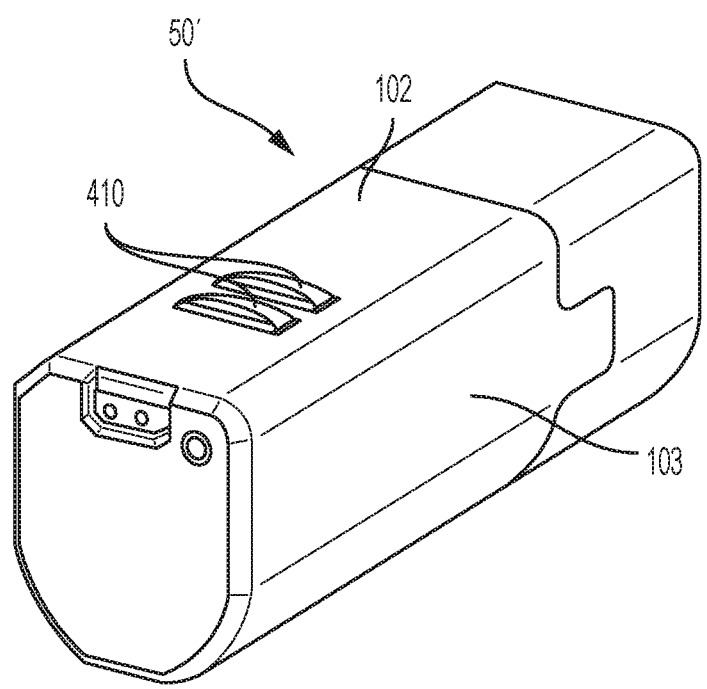
FIG. 20 illustrates another view of the exemplary embodiment of the battery pack shown in FIG. 19.
Figure 21:
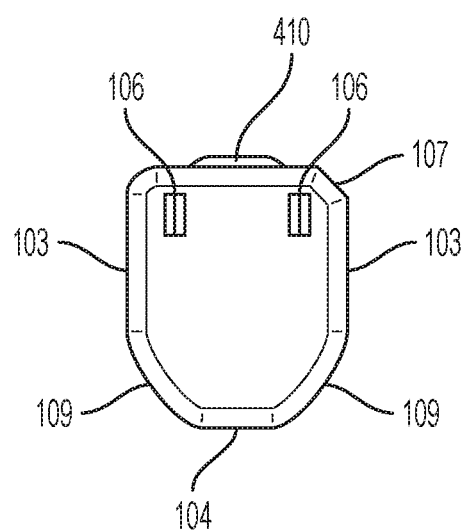
FIG. 21 illustrates another view of the exemplary embodiment of the battery pack shown in FIG. 19.
Figure 22:
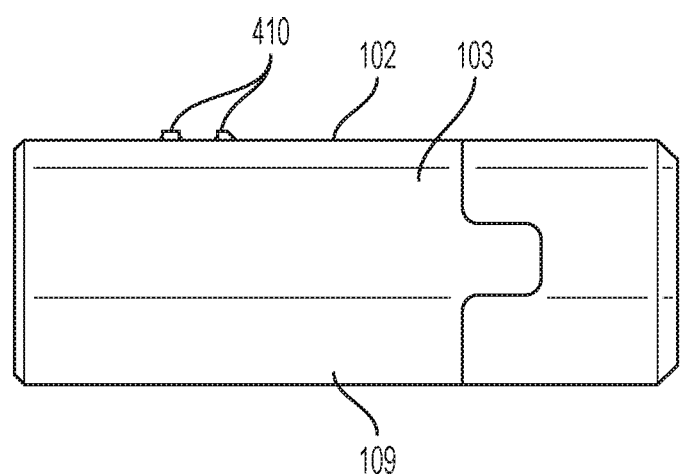
FIG. 22 illustrates another view of the exemplary embodiment of the battery pack shown in FIG. 19.
Figure 23:
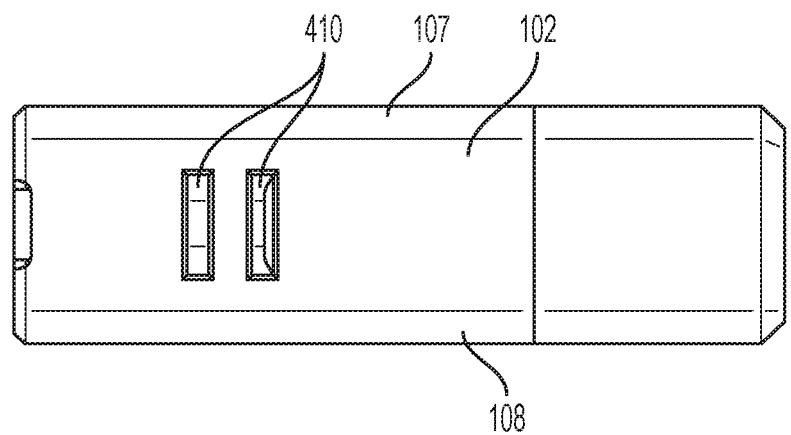
FIG. 23 illustrates another view of the exemplary embodiment of the battery pack shown in FIG. 19.
Figure 24:
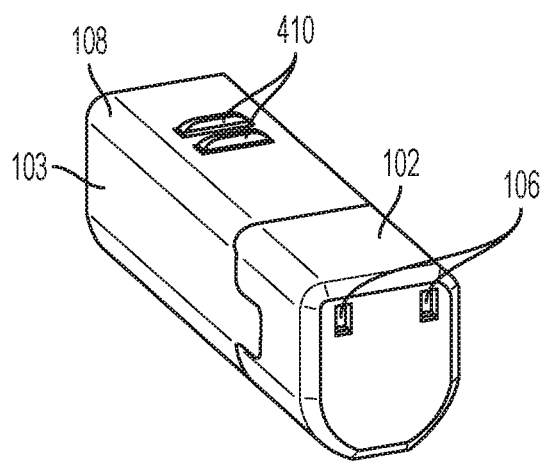
FIG. 24 illustrates another view of the exemplary embodiment of the battery pack shown in FIG. 19.
Figure 25:
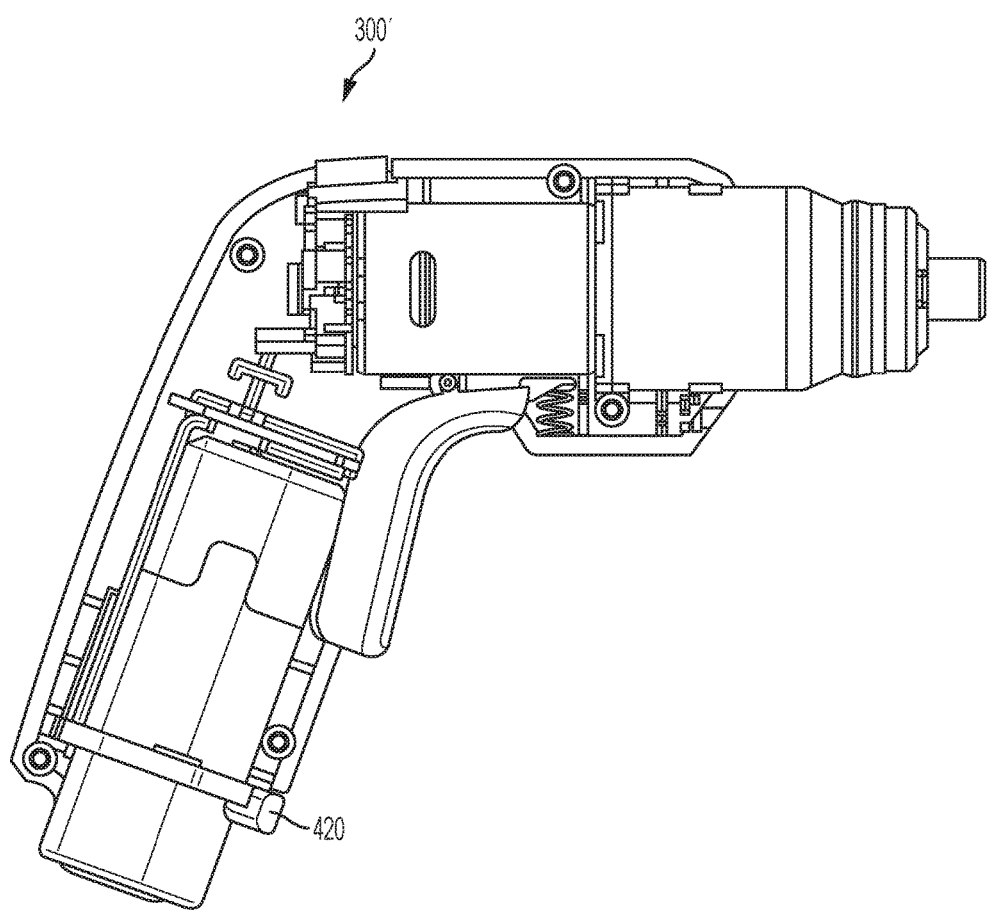
FIG. 25 illustrates an exemplary embodiment of the battery pack of FIG. 19 and another exemplary embodiment of a screwdriver.
Figure 26:
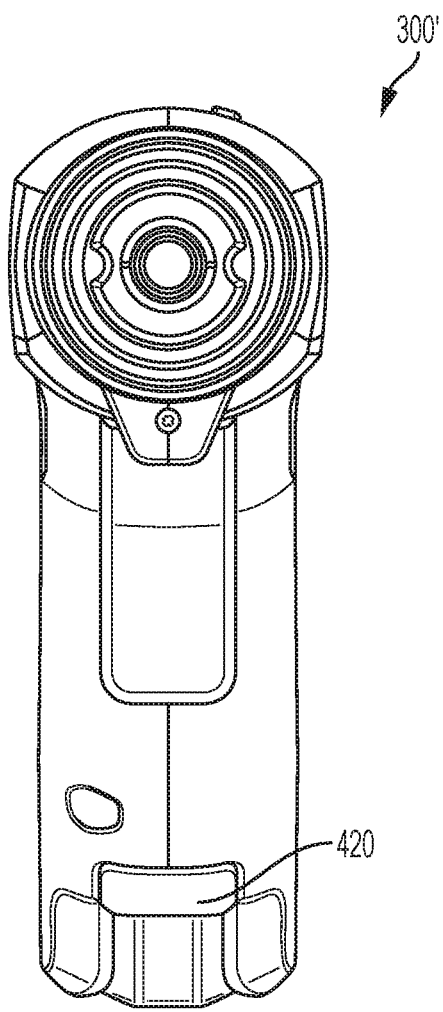
FIG. 26 illustrates another view of the exemplary embodiment of the battery pack and screwdriver of FIG. 25.
Figure 27:
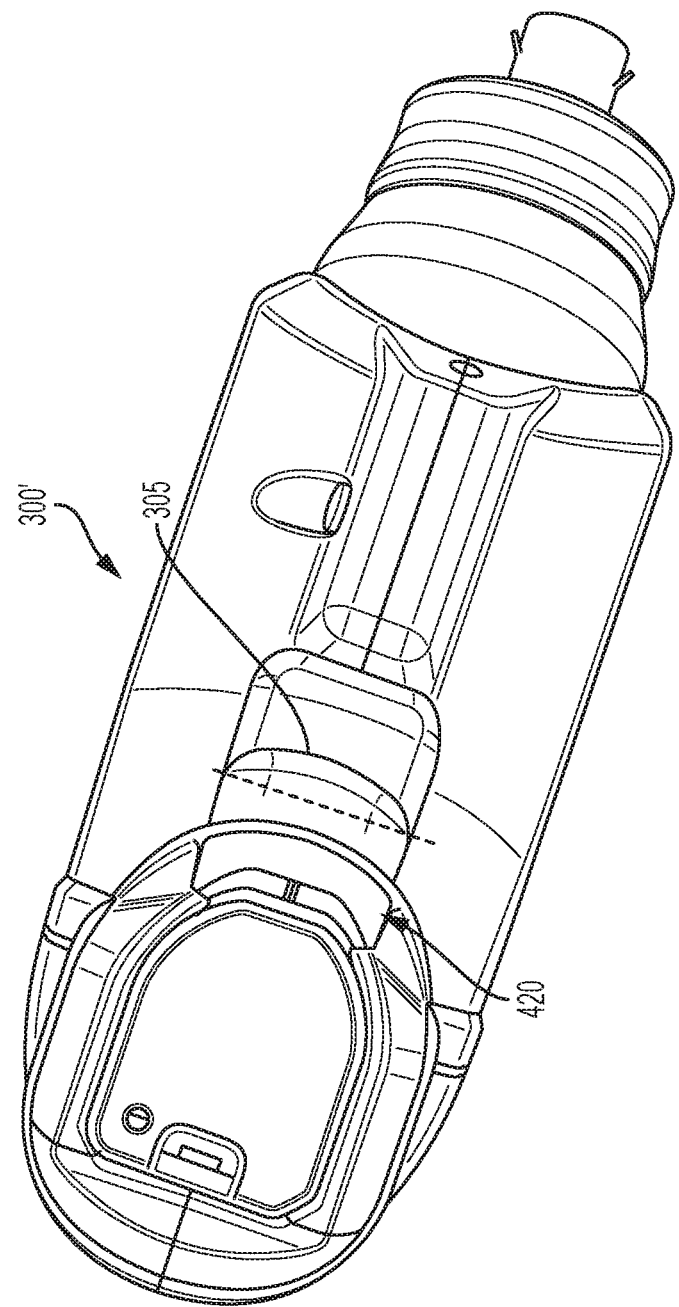
FIG. 27 illustrates another view of the exemplary embodiment of the battery pack and screwdriver of FIG. 25.

FIGS. 16-18 illustrate the battery pack 50 being inserted into a screwdriver 300. The screwdriver 300 includes a housing 301 that forms a handle portion 302 and a motor housing portion 303. The motor housing portion houses a motor 310 which drives an output spindle 315 with a transmission 311 therebetween. The output spindle 315 is in the form of a bit holder in which various screwdriver or drill bits may be inserted. The motor 310, transmission 311 and bit holder 315 are arranged around a longitudinal axis G. The screwdriver 300 also includes a trigger 305 which is used to actuate the motor 310. As shown, the battery pack 50 is inserted into the handle portion 302 of the screwdriver 300 along a longitudinal axis F. The screwdriver 300 has a battery receiving compartment 307 for receiving the battery pack 50.

As shown in detail in FIG. 18, the screwdriver 300 includes a retention mechanism 320. The retention mechanism 320 includes an arm portion 321 and a latching portion 322. The latching portion 322 overlaps a portion of the battery pack 50 and engages with the retention feature 112 to hold the battery pack 50, as shown in FIG. 17. The retention mechanism 320 is biased by a spring 323 towards a position of locking the battery pack 50 in the screwdriver 300 (i.e., it is biased towards the position of FIG. 17). Thus, the battery pack 50 can be simply and securely held in the screwdriver 300. The exemplary embodiment shows the retention mechanism 320 in the context of a screwdriver 300. It should be understood that the same or similar retention mechanism 320 may be used in the other devices 20 contemplated by this application.

The screwdriver 300 includes an electrical connection portion 350 which includes connectors that engage with the connectors 123. It also includes wires which connect the connection portion 350 to the motor, thereby supplying power from the battery pack 50 to the motor 310. Again, a similar system is used in the other devices 20 as is understood by one of ordinary skill in the art. The screwdriver 300 or other device 20 may also optionally include a battery pack ejection spring 351 which biases the battery pack 50 in a direction away from engagement with the device.

FIG. 16B shows a bottom view of the screwdriver 300 with the battery pack 50 inserted therein. As shown in this illustration, the opening 308 for the battery receiving compartment 307 has a shape that matches the outer surfaces of the battery pack 50. Particularly, inside surfaces of the opening 308 and battery receiving compartment 307 have complementary shapes to the surfaces 102, 103, 104, 107, 108 and 109. This guides the battery pack 50 into the receiving compartment 307 while providing a good fit. In the exemplary embodiment, the opening 308 and battery receiving compartment 307 have complementary shapes for all of the surfaces 102, 103, 104, 107, 108 and 109. However, the opening 308 and/or battery receiving compartment 307 may have complementary surfaces shapes for less than all of the battery pack surfaces, such as one, two, three, four or five of the surfaces. For example, it may have complementary surfaces for 102, 103, 104, 107 and 109, but not for the corner 108 or complementary surfaces for 102, 104, 107, 108 and 109, but not for one or both sides 103.

Furthermore, as shown in FIG. 16B, the opening 113 for the second electrical connector 124 is accessible even when the battery pack 50 is inserted into the screwdriver 300. Thus, the battery pack 50 may be connected to a charging source even when it is in a powered device. The battery receiving compartment 307 and opening 308 therefore are illustrated in detail with respect to the screwdriver 300. However, it is understood that the other powered devices 20 may include a similar battery receiving compartment 307 and opening 308 in order to receive the battery pack 50.

FIGS. 19-27 illustrate another exemplary embodiment of the battery pack 50' and screwdriver 300' which includes a different method for retaining the battery pack 50' in the screwdriver 300'. The battery pack 50' and screwdriver 300' should be presumed to the same as battery pack 50 and screwdriver 300 unless otherwise discussed. As shown in the figures, battery pack 50' includes a pair of ribs 410 instead of the retention feature 112 of the battery pack 50. The screwdriver 300' includes a latch 420 which seats between the ribs 410 so as to secure the battery pack 50 into the screwdriver 300'. The battery latch 420 may be the same or similar to the type shown in U.S. Pat. No. 5,856,038, which is hereby incorporated by reference. The latch 420 may also be incorporated into the other devices 20.

As shown in FIGS. 28-31, according to another exemplary embodiment, the battery pack includes a wireless charging circuit which enables wireless charging of the battery pack. The wireless charging receiver coil can be added to the battery packs 50 or 50'. Unless otherwise stated, the other features of the pack are the same as in the other embodiments.

Figure 28:
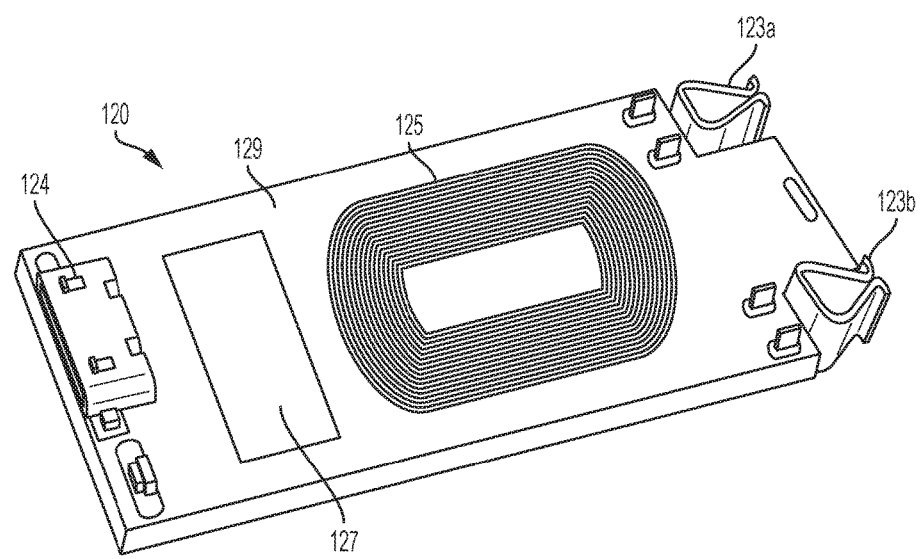
FIG. 28 illustrates an embodiment of the circuit board of a battery pack including a wireless charging receiver coil.
Figure 29:
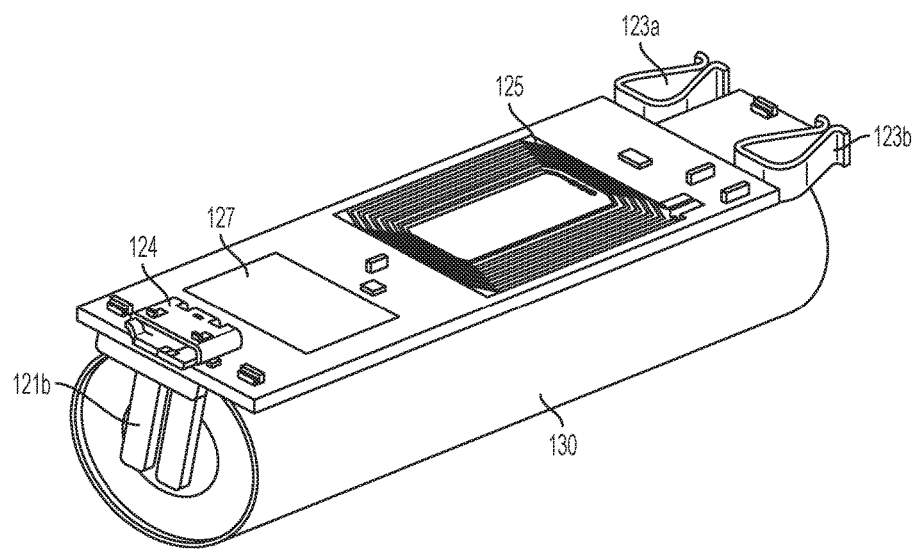
FIG. 29 illustrates an embodiment of the circuit board and battery cell of a battery pack including a wireless charging receiver coil.
Figure 30:
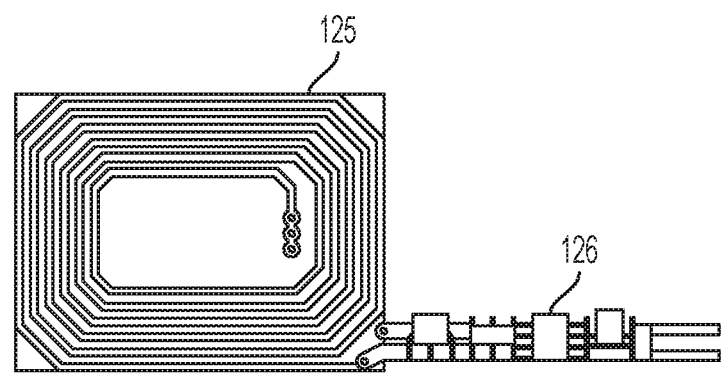
FIG. 30 illustrates an exemplary embodiment of a wireless charging receiver coil.

As shown in FIG. 28, according to this exemplary embodiment, a wireless charging receiver coil 125 is mounted on circuit board 120. A controller 127 may additionally be mounted to the circuit board 120 in order to control the wireless charging receiver coil 125, the signal received from a wireless charger or associated circuitry or parts. The controller 127 may also perform other functions. FIG. 29 illustrates the circuit board 120 as mounted on a battery cell 130 and FIG. 30 provides a view of the coils 125 with wires 126 protruding out of the coils 125 for connecting with the circuit board 120 or battery cell 130. The wireless charging receiver coil 125 stays within the footprint of the circuit board 120. Accordingly, adding the receiving coil 125 does not increase the size of the battery pack 50, 50'. Additionally, because the receiver coil 125 is thin, it does not protrude from the circuit board face 129 farther than the electrical connectors 123 and, therefore, does not increase the size of the battery pack 50, 50' in that dimension as well.

As can be appreciated, the receiver coil 125 is mounted on the circuit board 120 which is electrically connected to the battery cell 130 and can therefore be used to charge the battery cell 130. Wireless charging is described in U.S. Pat. No. 9,136,729, which is hererby incorporated by reference in its entirety and the receiver coil 125 would allow the battery packs of the present exemplary embodiment to be charged as discussed in the '729 patent. Particularly, the battery pack 50, 50' with a receiver coil 125 may be charged by a battery pack charger having at least one transmitter coil for generating a magnetic field which induces a voltage in the receiver coil, and a control circuit for controlling the amount of power that is provided to the transmitter coil.

Figure 31:
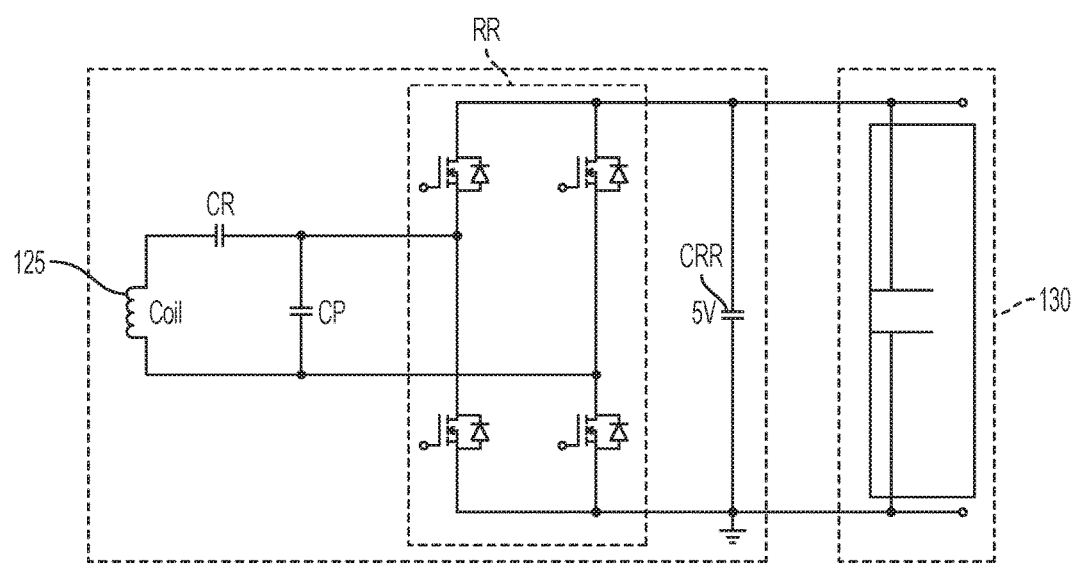
FIG. 31 illustrates a schematic of a circuit for a battery cell and a wireless charging receiver coil.

A diagram of the circuit on the circuit board 120 for use with the coil 125 is shown in FIG. 31. As shown in FIG. 31, the battery pack 50, 50' may have a receiver coil 125 with a resonance capacitor CR in series with receiver coil 125 for efficient power transfer. In addition, a capacitor CP in parallel with receiver coil 125 (and resonance capacitor CR) can be used for detection purposes.

A full-bridge rectifier RR is preferably connected to the receiver coil 125 and capacitors. The rectifier RR may be a diode rectifier or switched rectifier. Persons skilled in the art will recognize that it is preferable to provide the rectifier RR with a capacitor CRR to smooth the DC voltage output.

In the shown exemplary embodiment, the circuit board 120 continues to include the second electrical connector 124 in the form of a micro-USB port. This configuration gives the user the option of charging the battery cell 130 through the micro-USB port 124 or through the wireless receiver coil 125. Alternatively, the second electrical connector 124 can be removed and the wireless receiver coil 125 can be relied upon as the sole means of charging.

The description of the invention is merely exemplary in nature. Additionally, various features of the exemplary embodiments may be used independently from one another or in combination.

What is claimed is:

1. A battery pack comprising:
   a battery cell assembly, the battery cell assembly comprising:
   a battery cell having a first end and a second end;
   a circuit board adjacent to the battery cell and extending from the first end of the battery cell to the second end of the battery cell;
   a first electrical connector disposed at the first end of the battery cell and connecting a first end of the circuit board to the first end of the battery cell;
   a second electrical connector disposed at the second end of the battery cell and connecting a second end of the circuit board to the second end of the battery cell;
   a third electrical connector disposed at the first end of the circuit board, the third electrical connector being configured to be electrically connected to a powered device so that power from the battery cell may be provided to the powered device through the third electrical connector; and a housing which houses the battery cell assembly.

2. The battery pack of claim 1, wherein the battery pack further comprises a fourth electrical connector disposed at the second end of the circuit board, the fourth electrical connector being configured to be connectable to a charging source so that a charge can be provided to the battery cell through the fourth electrical connector.

3. The battery pack of claim 1, wherein the third electrical connector comprises a pair of adjacent electrical connectors which provide a positive and negative electrode.

4. The battery pack of claim 3, wherein the battery cell has one of a positive electrode and a negative electrode at the first end and the other of the positive electrode and the negative electrode at the second end.

5. The battery pack of claim 1, wherein the housing comprises a first opening through which the third electrical connector is accessible and a second opening through which the fourth electrical connector is accessible.

6. The battery pack of claim 1, wherein the housing comprises a first end portion adjacent to the first end of the battery cell and the first end of the circuit board.

7. The battery pack of claim 1, wherein the housing comprises a circuit board side adjacent to the circuit board, the circuit board side of the housing having a rectangular shape and covering the circuit board.

8. The battery pack of claim 1, wherein the circuit board has a width Y and the battery cell has a width D;
wherein the width Y is 120% or less of the width D.

9. The battery pack of claim 1, wherein the housing has a primary width A; and
wherein the primary width A is 130% or less of the width D and 130% or less of the width Y.

10. The battery pack of claim 1, wherein the circuit board is flat.

11. The battery pack of claim 10, wherein the battery cell is cylindrical.

12. A battery pack comprising:
a battery cell having a first end and a second end;
an input electrical connector disposed adjacent the first end, the input electrical connector being configured to be connectable to a charging source so that a charge can be provided to the battery cell through the input electrical connector so as to charge the battery cell;
an output electrical connector disposed at the second end and being configured to be electrically connected to a powered device so that power from the battery cell may be provided to a powered device through the output electrical connector; and
a housing which houses the battery cell;
wherein a width of the housing is 130% or less of a width of the battery cell.

13. The battery pack of claim 12, wherein the output electrical connector comprises a pair of adjacent electrical connectors which provide a positive and negative electrode.

14. The battery pack of claim 13, wherein the battery cell has one of a positive electrode and a negative electrode at the first end and the other of the positive electrode and the negative electrode at the second end.

15. The battery pack of claim 1, wherein the housing comprises a first opening through which the output electrical connector can be accessed and a second opening through which the input electrical connector can be accessed.

16. The battery pack of claim 1, wherein the circuit board is flat and the battery cell is cylindrical.

17. A system comprising:
a battery pack;
at least one device selectively engaged with and powered by the battery pack;
wherein the battery pack comprises:
a battery cell assembly, the battery cell assembly comprising:
a battery cell having a first end and a second end;
a circuit board adjacent to the battery cell and extending from the first end to the second end;
a first electrical connector disposed at the first end and connecting a first end of the circuit board to the first end of the battery cell;
a second electrical connector disposed at the second end and connecting a second end of the circuit board to the second end of the battery cell;
a third electrical connector disposed at the first end of the circuit board, the third electrical connector being configured to be electrically connected to a powered device so that power from the battery cell may be provided to the powered device through the third electrical connector; and
a housing which houses the battery cell assembly.

18. The system of claim 17, wherein the battery pack further comprises a fourth electrical connector disposed at the second end of the circuit board, the fourth electrical connector being configured to be connectable to a charging source so that a charge can be provided to the battery cell through the fourth electrical connector.

19. The system of claim 17, wherein the housing comprises a first end portion adjacent to the first end of the battery cell and the first end of the circuit board and;
wherein the first end portion is configured to be inserted into the at least one device.

20. The system of claim 17, wherein the at least one device comprises at least three devices.

* * * * *